(No Model.)
J. W. MORRIS.
PRESERVING BIVALVES.
No. 431,212.                     Patented July 1, 1890.
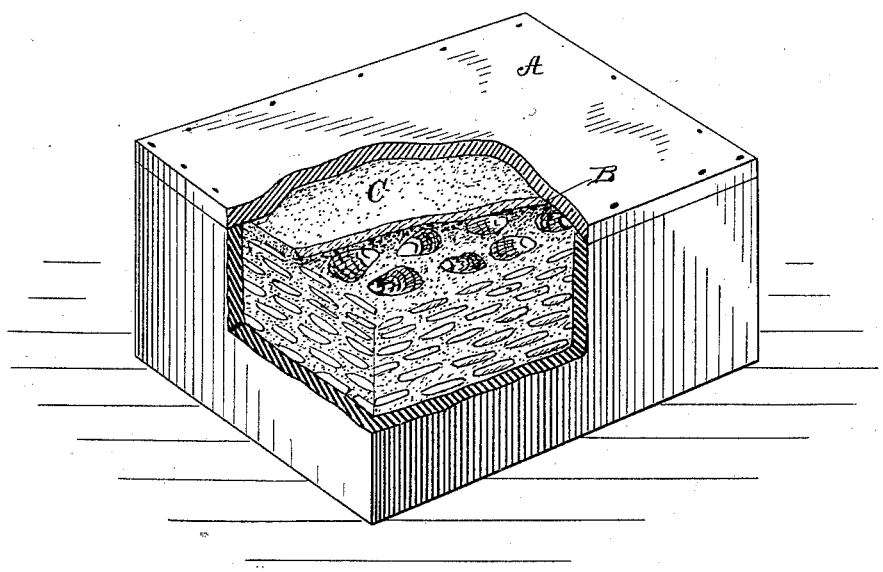
ATTEST:
INVENTOR.

UNITED STATES PATENT OFFICE.

JAMES WILLARD MORRIS, OF NEW YORK, N. Y.

PRESERVING BIVALVES.

SPECIFICATION forming part of Letters Patent No. 431,212, dated July 1, 1890.

Application filed October 15, 1889. Serial No. 327,068. (No model.)

*To all whom it may concern:*

Be it known that I, JAMES WILLARD MORRIS, a citizen of the United States, residing at New York city, in the county and State of New York, have invented a new and useful Method of Preserving Oysters and other Bivalves, of which the following is a specification.

The object of my invention is to preserve oysters and other bivalves in edible condition for a considerable period of time.

My invention consists in cementing the valves of the shells together preferably by incasing the live bivalves in a jacket of a material which will prevent their shells from opening.

I prefer to use a material like plaster-of-paris, which can be applied to the bivalve as a batter, and which will dry and harden on the shell thereof and set so that the shell will be prevented from opening, as if it were set in mortar. Plaster-of-paris is also a poor conductor of heat, and will therefore preserve a practically uniform temperature about the incased bivalves. It also receives water readily, and consequently as the water used to reduce it to a batter evaporates it may be replaced, and thus the bivalves kept in a moist condition. Preferably I apply this batter to the bivalves by pouring the same on them while they are in the package in which they are to be preserved; but they may be coated by dipping.

The accompanying drawing, forming part of this specification, illustrates the method in which my invention is applied.

A is the box or case in which the bivalves are to be preserved; B, oysters, which are preferably arranged in layers with spaces between, through which the batter may flow to every part of the box. C is the hardened plaster-of-paris, which has been poured on the oysters after the same have been properly arranged in the box, and which has hardened about the oysters so as practically to prevent them from opening their shells.

The method of preserving bivalves above set forth is simple, inexpensive, and effective, the incasing-jacket acting at once to prevent the shells from opening, as a non-conductor of heat, and as a receiver of moisture.

I am aware that fruit and vegetables have been preserved by incasing them in a coating of plaster-of-paris and other substances which sets and incases the article in an air-tight shell, and this I do not claim.

My invention relates to the preservation of bivalves. It is well known that the shells of oysters, for example, spread or open after exposure to the air for a short time, and this allows the ready entrance of air and the loss of moisture, which results in deterioration of the oyster. It has been proposed to preserve oysters, &c., for transportation by twisting a wire around them in such manner as to bind the shells together, and also to pack them so tightly in a box or case that the shells could not well separate. The first method is chiefly objectionable on account of the difficulty and expense of placing the wires on each individual oyster, and also because the wires frequently slipped off. The second method is objectionable for the reason that, however carefully the bivalves are packed, they are so shaken and loosened during transportation that some of them are allowed to open.

By my invention the shells of each bivalve are positively and securely held together, and the cementing of the shells may be accomplished in a very rapid and effective manner.

What I claim is—

1. The method of preserving bivalves, which consists in locking the parts or valves of the shells together by the application of a cementing substance thereto, substantially as described.

2. The method of preserving bivalves, which consists in cementing their shells together by a material which is a poor conductor of heat.

This specification signed and witnessed this 9th day of October, 1889.

J. WILLARD MORRIS.

Witnesses:
 D. H. DRISCOLL,
 WILLIAM PELZER.